United States Patent
Bruhnke et al.

(10) Patent No.: US 6,426,692 B1
(45) Date of Patent: Jul. 30, 2002

(54) DATA TRANSFER METHOD FOR A SCANNING IDENTIFICATION SYSTEM

(75) Inventors: Michael Bruhnke, München; Werner Blatz, Leingarten; Ulrich Friedrich, Ellhofen; Ulrich Grosskinsky, Neudenau, all of (DE)

(73) Assignee: ATMEL Germany GmbH, Heilbronn (DE)

( * ) Notice: Subject to any disclaimer, the term of this patent is extended or adjusted under 35 U.S.C. 154(b) by 0 days.

(21) Appl. No.: 09/254,867
(22) PCT Filed: Sep. 13, 1997
(86) PCT No.: PCT/EP97/05010
§ 371 (c)(1), (2), (4) Date: Jun. 14, 1999
(87) PCT Pub. No.: WO98/11496
PCT Pub. Date: Mar. 19, 1998

(30) Foreign Application Priority Data

Sep. 13, 1996 (DE) .......................... 196 37 319

(51) Int. Cl.⁷ ............................................... H04Q 5/22
(52) U.S. Cl. ............................................. 340/10.4
(58) Field of Search .............................. 340/10.1, 10.3, 340/10.4, 10.5, 10.32, 10.34, 10.51, 10.41, 3.2, 3.41, 3.61, 10.2; 342/42; 235/380; 327/525

(56) References Cited

U.S. PATENT DOCUMENTS 5,517,194 A * 5/1996 Carroll et al. ........... 342/10.32
5,537,105 A * 7/1996 Marsh et al. ............. 340/10.34
5,583,819 A * 12/1996 Roesner et al. .......... 340/10.51

FOREIGN PATENT DOCUMENTS

EP 0600556 A1 6/1994
EP 0689151 A2 12/1995

* cited by examiner

Primary Examiner—Michael Horabik
Assistant Examiner—William Bangachon
(74) Attorney, Agent, or Firm—Venable; Norman N. Kunitz

(57) ABSTRACT

In a method of transferring data from a transponder to a reading device in a scanning identification system through load-modulation of an inquiry signal emitted by the reading device, with the transponder being initialized at the beginning of the reception of the inquiry signal and responding with the emission of the response signal, first a predetermined number of data bits that are not part of the response signal are transmitted, and a terminator sequence followed by the response signal are repeatedly transmitted, until the inquiry signal is interrupted. The time required by the reading device for building up the inquiry field is bridged by the predetermined number of data bits and, at the same time, the reading device is synchronized to the clock of the response signal. Through the terminator sequence, which indicates the beginning of a valid response signal, the response signal is already recognized correctly by the reading device during the first transfer.

6 Claims, 2 Drawing Sheets

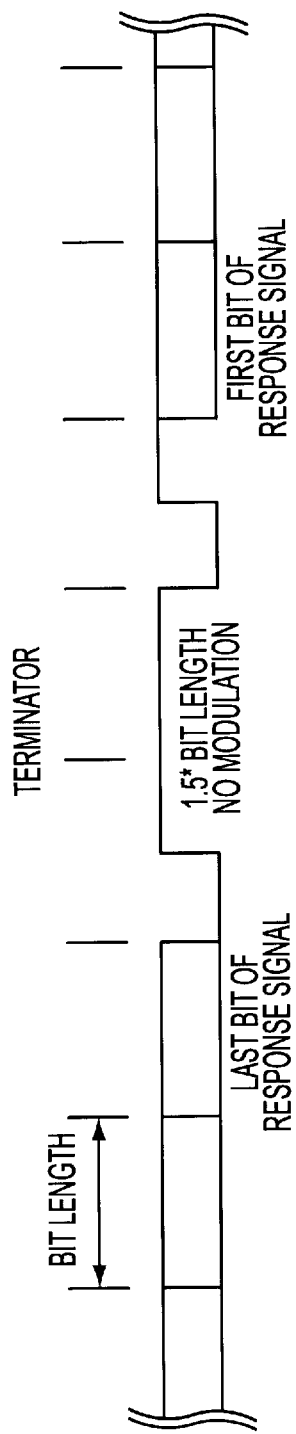

FIG. 2

| STATUS | TRANSMIT |
|---|---|
| FOLLOWING INITIALIZATION | 4 * "1" <br> TERMINATOR <br> ID CODE + TERMINATOR # |
| PROGRAM ⇒ READ <br> (PROGRAMMING AFTER READING) | 4 * "1" <br> TERMINATOR <br> DATA BLOCK + TERMINATOR # |
| WRITING ERROR | ID CODE ( FIRST 4 BITS: DON'T CARE) <br> TERMINATOR + ID CODE # |
| DIRECT ACCESS | 8 * "1" <br> TERMINATOR + DATA BLOCK # |
| CRYPTO RESPONSE SIGNAL | (FF00)$_h$ + 6-BIT CHECK SUM # <br> TERMINATOR + CRYPTO RESPONSE # |

: TRANSMIT REPEATEDLY UNTIL INQUIRY SIGNAL IS INTERRUPTED

FIG. 3

DATA TRANSFER METHOD FOR A SCANNING IDENTIFICATION SYSTEM

BACKGROUND OF THE INVENTION

The invention relates to a method of transferring data from a transponder to a reading device in a scanning identification system by means of load modulation of an inquiry signal emitted by the reading device.

In the last few years, a system for the identification of persons, animals and objects that has proven effective involves the supply of a transponder, which is connected to the object to be identified, with energy by a (stationary or portable) reading device, also referred to as a reader or base station, via an alternating field, whereupon the transponder responds by emitting the data it stores. Because of the frequency range used, the system is referred to as a radio-frequency identification system, or RFID for short.

An RFID transponder generally comprises an antenna coil and an integrated circuit containing all of the necessary electronic circuit blocks, such as those needed for voltage supply, timing generation, timing control and storing the data required for the identification. The capacity switched in parallel to the antenna coil is likewise often a component of the integrated circuit. It can, however, also be formed by a discrete component.

The RFID reading device comprises a resonating circuit having a transmitting coil and a capacitor that is actuated by a driver stage with a signal generally having a fixed frequency (e.g., 125 kHz). The reading device further includes electronic circuit blocks for recognizing data emitted by the transponder through absorption modulation, and for transmitting data and commands, e.g., through field modulation, to the transponder.

During the data or energy transfer, the reading device and the transponder form a loosely-coupled transformer. The energy transfer is therefore relatively low.

In the majority of identification applications of transponder/reading device systems, it is desirable and advantageous for the identification, that is, the exchange of data between the transponder and the reading device, to be effected without a delay. For example, a problem in the use of an anti-theft device is that, when a motor vehicle is started, the driver notices a time delay of more than 150 ms from the turning of the ignition key until the engine starts. Consequently, the entire transfer protocol must have run during this very short time period.

When the field is switched on, the reading device requires approximately two milliseconds before the high coil voltage of about 100 V has built up and the useful signal at a level of a few millivolts, which results from the modulation of the transponder, can be evaluated, and the data can thus be decoded correctly. The first ID code transmitted by the transponder is then recognized in the second sequence, which means a time delay of the data protocol. A similar problem occurs during the transition from a non-damped to the damped state, for example at the end of a writing sequence or programming sequence.

SUMMARY OF THE INVENTION

It is therefore the object of the invention to provide a method of transferring data from a transponder to a reading device in a scanning identification system through load modulation of an inquiry signal emitted by the reading device, the method providing the correct result through a one-time data transfer.

The above object generally is accomplished according to the invention. More specifically, in a method of transferring data from a transponder to a reading device in a scanning identification system through load modulation of an inquiry signal emitted by the reading device, with the transponder being initialized at the beginning of the reception of the inquiry signal and responding with the emission of the response signal, first a predetermined number of data bits that are not part of the response signal is transmitted, and a terminator sequence followed by the response signal is then repeatedly transmitted, until the inquiry signal is interrupted.

The predetermined number of data bits that are not part of the response signal bridges the time span required by the reading device for building up the inquiry field. At the same time, the reading device is synchronized to the clock of the response signal. With the terminator sequence, which indicates the beginning of a valid response signal, the response signal is already recognized correctly by the reading device during the first transfer.

The terminator sequence advantageously comprises a bit sequence that cannot occur in the actual response signal. For example, in the transmission of the terminator sequence, the inquiry signal is unmodulated for 1.5 bit periods. A sequence of this type cannot occur in the actual response signal, and is therefore reliably recognized by the reading device. It is also possible to load-modulate the inquiry signal for 1.5 bit periods during the transmission of the terminator sequence. The time frame of 1.5 bit periods is crucial for reliable recognition as a terminator sequence by the reading device.

A sequence of three to ten logical ones is transmitted as a predetermined number of data bits not belonging to the response signal. Within this time, the inquiry signal has generally built up to the point where the reading device can reliably decode the load-modulated response signal.

BRIEF DESCRIPTION OF THE DRAWINGS

FIG. 2 shows a terminator in the data flow.

FIG. 3 is a table showing the operating states that lead to the transmission of the terminator.

DESCRIPTION OF THE PREFERRED EMBODIMENTS

Figure 1:
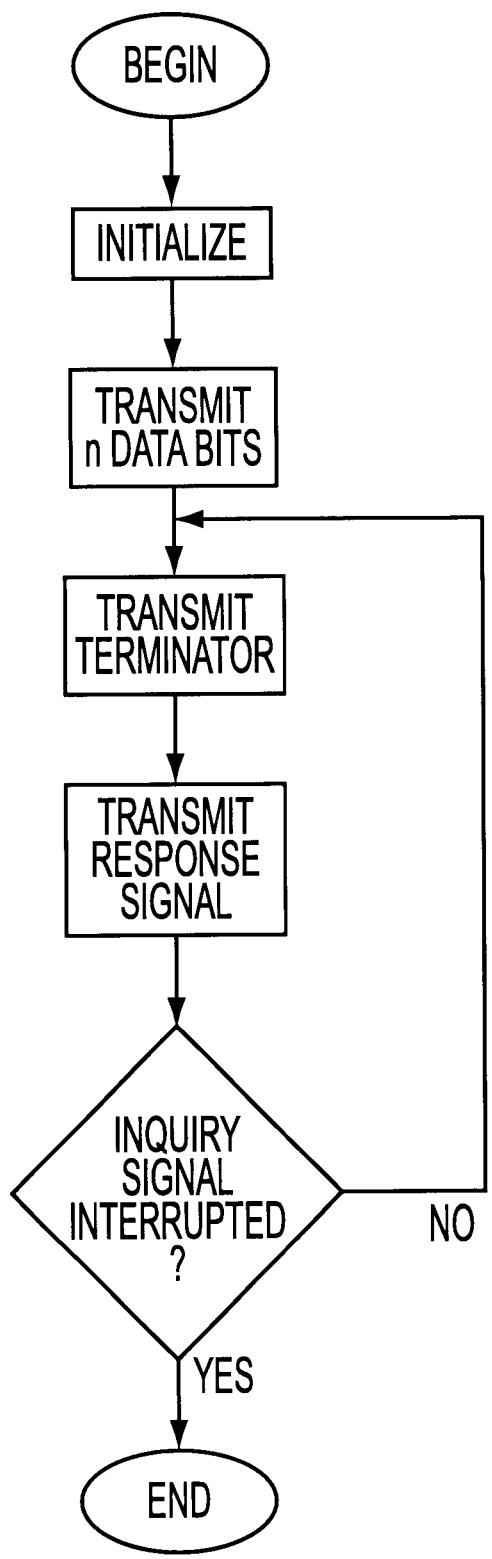
FIG. 1 is a flow chart of the method according to the invention.

To avoid the problem mentioned at the outset, at the beginning of the data transfer, for example during initialization, the transponder transmits a few irrelevant data bits, followed by a special pattern (terminator) that is atypical for data and comprises, for example, sequences of 1.5 bit periods. This synchronizes the reading device, and the beginning of a valid data word is additionally indicated by the terminator sequence, so the word is already correctly recognized during the first transfer.

FIG. 1 shows a flow chart of the method. The transponder is initialized after the inquiry signal generated by the reading device has been received. The initialization encompasses, on the one hand, the establishment of the communication parameters and the transition of the transponder into a defined initial state. The transponder subsequently begins to transmit data to the reading device through load modulation of the inquiry signal. To give the reading device sufficient time to generate an inquiry signal that is constant within a specific frame, and is necessary for the reliable decoding of the data transmitted by the transponder to the reading device, first the transponder transmits a predetermined number of data bits that are not part of the response signal. During this time, the reading device is also synchronized to the response signal.

A terminator sequence is then transmitted; this sequence is distinguished by the fact that it cannot occur in the actual data flow. A three-bit-long sequence in which the inquiry signal is unmodulated for 1.5 bit periods has proven especially advantageous. FIG. 2 shows a terminator in the data flow. In addition to the fact that this sequence cannot occur in the actual data flow, the sequence is distinguished by a very short duration.

Following the terminator sequence, the response signal is transmitted to the reading device. If the reading device has recognized the terminator sequence, it is highly probable that the response signal will immediately be decoded correctly. Despite this, the transponder repeatedly transmits the response signal, followed by a terminator sequence, until the inquiry signal is interrupted. Then either the communication between the reading device and the transponder is ended, or the reading device transfers data or commands to the transponder.

The table of FIG. 3 describes a number of operating states in which it is practical to transmit a terminator sequence for increasing the effectiveness of the data transfer. Thus, it is advantageous to supplement the response signal with the terminator sequence not only during the initialization, but also during the transition from writing access to reading access, following a writing error, during direct access and during the transmission of a cryptographic response.

Advantage: The data can immediately be recognized correctly during the first transmission. This reduces the length of the data transfer.

What is claimed is:

1. A method of transferring data from a transponder to a reading device in a scanning identification system through load modulation of an inquiry signal emitted by the reading device, with the transponder being initialized at the beginning of the reception of the inquiry signal and responding with the transmission of a response signal, and wherein first a predetermined number of data bits that are not part of the response signal are transmitted, and then a terminator sequence followed by the response signal are repeatedly transmitted until the inquiry signal is interrupted.

2. The method of transferring data according to claim 1, wherein the terminator sequence comprises a bit sequence that cannot occur in the actual response signal.

3. The method of transferring data according to claim 1, wherein the inquiry signal is not modulated for 1.5 bit periods during the transmission of the terminator sequence.

4. The method of transferring data according to claim 1, wherein the inquiry signal is load-modulated for 1.5 bit periods during the transmission of the terminator sequence.

5. The method of transferring data according to claim 1, wherein a sequence of three to ten logical ones is transmitted as the predetermined number of data bits that are not part of the response signal.

6. The method of transferring data according to claim 1, wherein a sequence of three to ten logical zeroes is transmitted as the predetermined number of data bits that are not part of the response signal.

* * * * *